(12) United States Patent
Tamura (10) Patent No.: US 8,035,730 B2
(45) Date of Patent: Oct. 11, 2011

(54) DIGITAL CAMERA AND FLASH EMISSION CONTROL METHOD BASED ON FACE DETECTION

(75) Inventor: Kazunori Tamura, Asaka (JP)

(73) Assignee: Fujifilm Corporation, Tokyo (JP)

( * ) Notice: Subject to any disclaimer, the term of this patent is extended or adjusted under 35 U.S.C. 154(b) by 169 days.

(21) Appl. No.: 12/382,990

(22) Filed: Mar. 27, 2009

(65) Prior Publication Data

US 2009/0190002 A1 Jul. 30, 2009

Related U.S. Application Data

(63) Continuation of application No. 11/907,486, filed on Oct. 12, 2007, now Pat. No. 7,978,262.

(30) Foreign Application Priority Data

Oct. 13, 2006 (JP) .................................. 2006-280013

(51) Int. Cl.
*H04N 5/222* (2006.01)
*H04N 5/235* (2006.01)

(52) U.S. Cl. ..................................... 348/371; 348/222.1

(58) Field of Classification Search .................. 348/370, 348/371, 241, 222.1, 77, 78; 396/157, 158
See application file for complete search history.

(56) References Cited

U.S. PATENT DOCUMENTS

| | | | |
|---|---|---|---|
| 2003/0071908 A1* | 4/2003 | Sannoh et al. | 348/345 |
| 2004/0207743 A1* | 10/2004 | Nozaki et al. | 348/333.12 |
| 2006/0028552 A1* | 2/2006 | Aggarwal et al. | 348/169 |
| 2006/0044422 A1* | 3/2006 | Miyazaki | 348/234 |
| 2007/0052820 A1* | 3/2007 | Ikeda | 348/231.99 |
| 2007/0064145 A1* | 3/2007 | Sugimoto | 348/345 |
| 2007/0263909 A1 | 11/2007 | Ojima et al. | |

FOREIGN PATENT DOCUMENTS

| | | |
|---|---|---|
| JP | 2001-215404 A | 8/2001 |
| JP | 2003-107567 A | 4/2003 |
| JP | 2006-33440 A | 2/2006 |

OTHER PUBLICATIONS

Notification of Grounds for Rejection for Japanese Application No. 2006-257972 dated Dec. 7, 2010.

* cited by examiner

*Primary Examiner* — Nicholas Giles
(74) *Attorney, Agent, or Firm* — Birch, Stewart, Kolasch & Birch, LLP

(57) ABSTRACT

A digital camera includes an imaging unit for generating image data, an emission unit for emitting a flash, a face detection unit for detecting face information in the image data, and an emission amount control unit for controlling the emission amount of a flash. A plurality of time points is set in a period from the time when generation of image data is started to the time when a flash is emitted, each as a time point where a detection result of the face detection unit is supplied to the emission control unit. The emission amount for the flash is obtained by selectively referring to the plurality of detection results and performing one of a plurality of arithmetic operations selected based on the referenced detection result.

4 Claims, 10 Drawing Sheets

DIGITAL CAMERA AND FLASH EMISSION CONTROL METHOD BASED ON FACE DETECTION

This application is a Continuation of application Ser. No. 11/907,486, filed on Oct. 12, 2007, now U.S. Pat. No. 7,978,262 and Japanese Patent Application No. 280013/2006 filed on Oct. 13, 2006, the entire contents of which are hereby incorporated by reference and for which priority is claimed under 35 U.S.C. §120.

BACKGROUND OF THE INVENTION

1. Field of the Invention

The present invention relates to a digital camera that controls the emission amount of a flash using face information included in a subject, and a method therefor.

2. Description of the Related Art

Generally, digital cameras initiate image taking before the shutter release button is depressed, and exposure control and focus control are performed using the image obtained during that period. The image obtained during that period is also used for a flash control to obtain an adequate emission amount of a flash. In the past, the method in which the adequate amount of flash is obtained based on the overall brightness of the obtained image has been commonly used. Recently, however, a flash control method in which face detection is performed on the obtained image, and emission amount of the flash is controlled according to existence or nonexistence of a face, or the proportion of the detected face in the image.

For example, U.S. Patent Application Publication No. 20030071908 describes a method in which emission amount of a flash is reduced if a face is detected and the ratio of the face in the image is greater than or equal to a predetermined value. Further, U.S. Patent Application Publication No. 20060044422 describes a method in which emission amount of a flash is obtained using only the image data of a region corresponding to a face in the image, or using image data in which a region corresponding to a face in the image is weighted greater than for the other regions.

Further, when a person is imaged with a flash at night or in a dark place, the eyes of the person may sometimes be imaged in red or gold (hereinafter, collectively referred to as "red eye" including gold and other colors). It is known that the red eye phenomenon occurs when the pupils of the eyes are opened widely. Consequently, some digital cameras have a function to emit a flash to close the pupils to a certain degree prior (hereinafter referred to as "redeye reduction emission") to performing flash photography, and thereafter performing ordinary flash photography as described, for example, Japanese Unexamined Patent Publication No. 2001-215404.

The methods described in U.S. Patent Application Publication Nos. 20030071908 and 20060044422 may obtain an image of appropriate brightness without halation in the face portion or without the face portion becoming too dark, if the content of image data obtained for face detection is identical to the content of image data obtained for light control. But, the position of a face included in the image data obtained for light control may sometimes differ from the position of the face detected from the image data obtained for face detection, since the face detection is performed prior to exposure control and focus control. In this case, the emission amount obtained based on the data of a region extracted as the region corresponding to the face may not become an optimum amount. Further, a more inadequate emission amount may be set in comparison with a case where the emission amount is obtained without considering the face, depending on an object newly located in the region where the face was detected as a result of the change in the face position.

The aforementioned problem is particularly serious for flash photography involving the redeye reduction emission. The redeye reduction emission is primarily performed for closing the pupils to a certain degree, and the imaging is suspended for a certain time which is required by the pupils to contract in response to the redeye reduction emission, so that it is more likely that the aforementioned problem occurs in comparison with imaging without the redeye reduction emission.

It is an object of the present invention to provide a digital camera capable of invariably performing a flash emission with an appropriate amount by solving the problem arising from the movement of the subject or digital camera during the time frame between the face detection and light control in imaging involving the redeye reduction emission described above.

SUMMARY OF THE INVENTION

The present invention proposes the following digital cameras and control methods as the means for solving the problem described above.

A first digital camera of the present invention includes: an imaging unit such as a CCD (Charge Coupled Device) for generating image data representing a subject; a flash unit for emitting a flash; a face detection unit for performing face detection on the image data generated by the imaging unit; and an emission control unit for causing the flash unit to perform a redeye reduction emission and a main emission. The face detection unit performs face detection on redeye reduction emission image data representing the subject at the time of the redeye reduction emission performed by the flash unit, and supplies the result of the detection to the emission control unit. The emission control unit determines the emission amount for the main emission using a detection result of the detection performed on the redeye reduction emission image data.

A first method of the present invention is a method for controlling the first digital camera described above. The method includes the steps of: while causing the flash unit to perform a redeye reduction emission, generating redeye reduction emission image data representing the subject when the redeye reduction emission is performed; performing detection of face information on the redeye reduction emission image data; determining the emission amount for main emission of the flash using a detection result of the detection; and causing the flash unit to perform the main emission with the determined emission amount.

The referent of "main emission" as used herein means an essential emission in flash photography, i.e., the emission of a required and sufficient amount of light onto a subject for obtaining an image of the subject. The referent of "redeye reduction emission" as used herein means an emission performed prior to a main emission with an intention to close the pupils of the eyes of a subject to a certain degree so that the eyes of the subject will not be imaged in red due to reflected light from the pupils in the main emission. The referent of "using a detection result of the detection" as used herein means to use a result showing that a face is not detected, a result showing that a face is detected, or information of the detected face (position, size, and the like).

In the first digital camera and method, the face detection result used for the determination of the emission amount for the main emission is the detection result of face detection performed on the image data obtained when the redeye reduction emission is performed. Thus, the time interval between the acquisition of image data for face detection and the acquisition of image data for light control becomes relatively short, and the probability that the subject or digital camera is moved during that time interval becomes smaller than in the conventional digital cameras. Further, when face detection is performed on image data obtained at night or in a dark place without light, the face may not sometimes be detected successfully. But in the first digital camera and method described above, face detection is performed on image data obtained when a redeye reduction emission is performed, so that the face may be detected with relatively high accuracy.

A second digital camera of the present invention includes: an imaging unit for generating image data representing a subject; a flash unit for emitting a flash; a face detection unit for performing face detection on the image data generated by the imaging unit; and an emission control unit for causing the flash unit to perform a redeye reduction emission and a main emission. Here, the face detection unit performs face detection on image data generated by the imaging unit during the period after the time point when the redeye reduction emission is performed and before the time point when the main emission is performed, and supplies detection results of the detection to the emission control unit. The emission control unit determines the emission amount for the main emission using the detection results supplied from the face detection unit and causes the flash unit to perform the main emission with the determined emission amount.

A second method of the present invention is a method for controlling the second digital camera described above. The method includes the steps of: causing the flash unit to perform a redeye reduction emission; generating image data representing the subject during the period after the time point when the redeye reduction emission is performed and before the time point when a main emission is performed; performing detection of face information on the generated image data; determining the emission amount for the main emission of the flash using a result of the detection; and causing the flash unit to perform the main emission with the determined emission amount.

In the second digital camera and method of the present invention, the face detection result used for the determination of the emission amount for the main emission is one of the detection results of face detection performed on one of image data sets obtained during the period after the time point when the redeye reduction emission is performed and before the time point when the main emission is performed. Thus, the time interval between the acquisition of image data for face detection and the acquisition of image data for light control becomes relatively short, and the probability that the subject or digital camera is moved during that time interval becomes smaller than in the conventional digital cameras. In particular, if the latest result of the detection results obtained during that time frame is used for the determination of the emission amount for the main emission, the face position in the image data for face detection and the face position in the image data for light control substantially correspond to each other, so that the problem arising from the change in the face position does not occur.

The present invention further provides a third digital camera having both of the functions of the first and second digital cameras described above and one of the functions is used selectively.

DESCRIPTION OF THE PREFERRED EMBODIMENTS

Figure 1A:
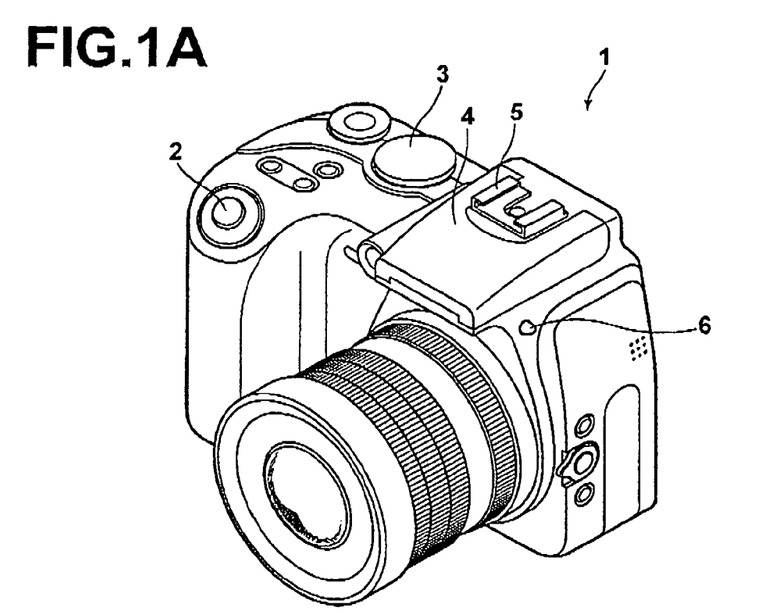
FIG. 1A is an overview of the digital camera according to an embodiment of the present invention (normal view).
Figure 1B:
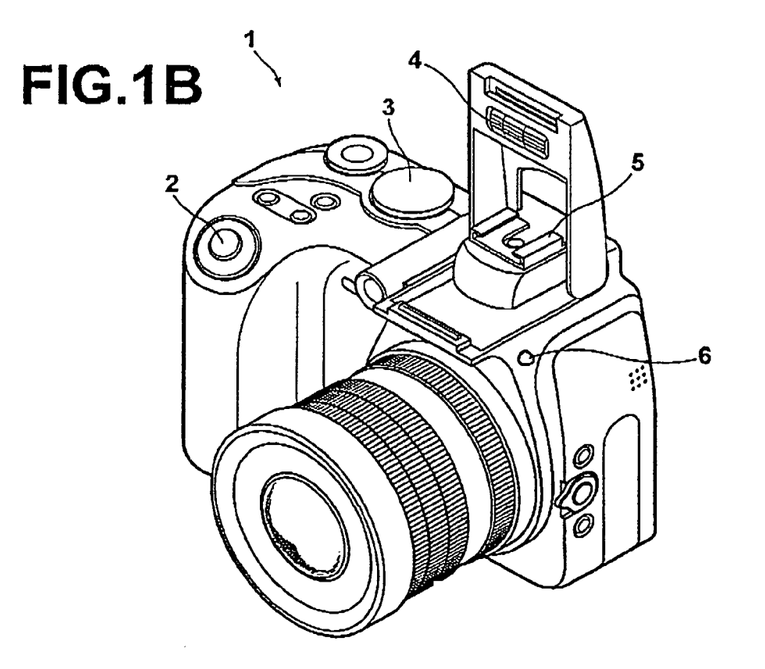
FIG. 1B is an overview of the digital camera according to an embodiment of the present invention (view with a built-in flash being popped up).
Figure 1C:
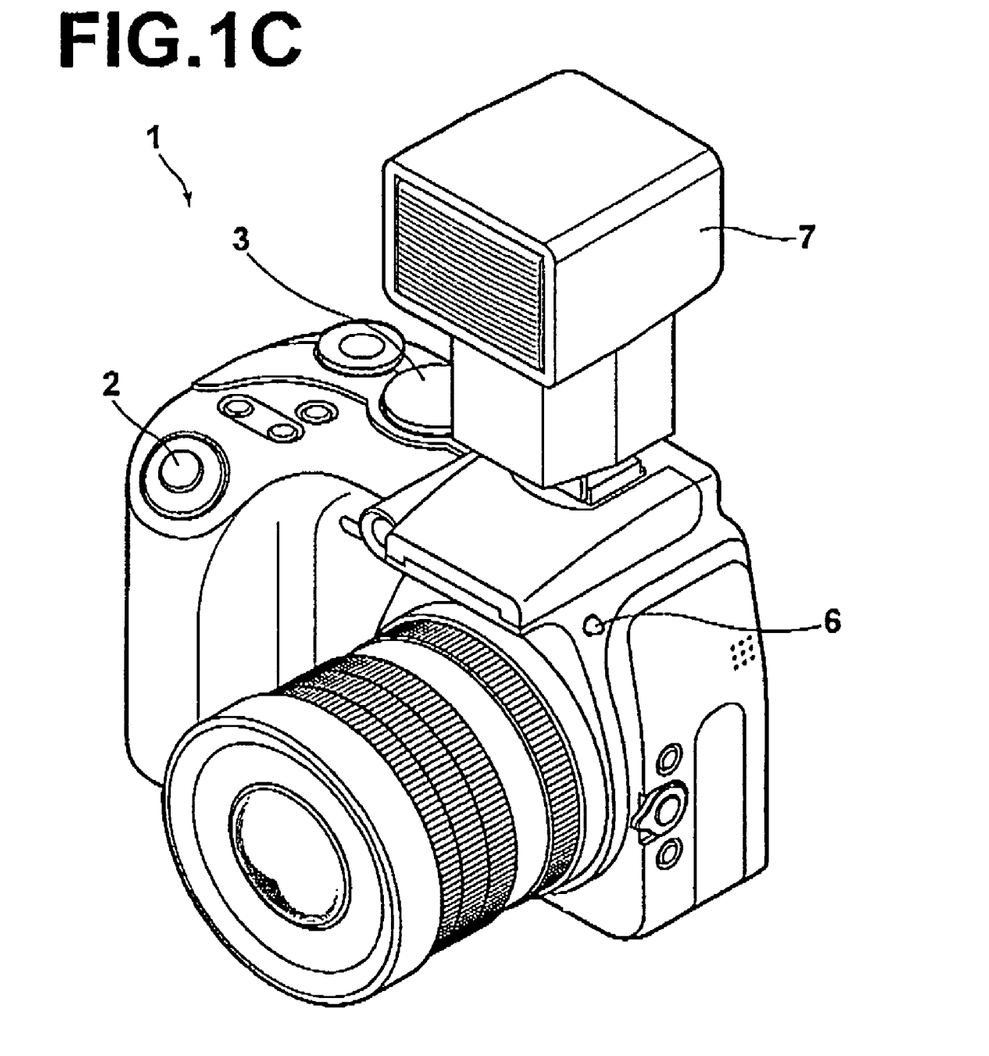
FIG. 1C is an overview of the digital camera according to an embodiment of the present invention (view with an external flash being attached).

Hereinafter, as exemplary embodiments of the present invention, single-lens reflex digital cameras having flash photography functions and methods for controlling the emission amount of the flash of the digital cameras will be described.
Structure of the Digital Camera FIGS. 1A to 1C illustrate overviews of a digital camera 1 according to an embodiment of the present invention. As illustrated in FIG. 1A, the digital camera 1 includes, on the upper side thereof, a shutter release button 2, a mode dial 3 for selecting an imaging mode, a built-in flash 4, and a hot shoe 5, which is a receptacle for attaching an accessory.

The shutter release button 2 has a two-step mechanism to allow two different operational instructions to be given. For example, in photography using an auto exposure (AE) function and auto focus (AF) function, the digital camera 1 performs preparatory operations for the photography, such as exposure control, focus control, and the like, when the shutter release button 2 is lightly depressed (halfway depression). Under this state, when the shutter release button 2 is depressed strongly (full depression), the digital camera 1 initiates the exposure and records image data corresponding to a single screen obtained by the exposure in a memory card.

The built-in flash 4 swings up (pops up) when a flash pop up button 6, provided on the side, is depressed, as illustrated in FIG. 1B. Further, the flash pops up automatically in a certain imaging mode. The popped up built-in flash 4 emits light two or three times in association with a second step depression of the shutter release button 2. When the redeye reduction emission function is disabled, two emissions are performed, one of which is a preliminary emission (pre-emission) for measuring the amount of light reflected back from a subject, and other of which is a main emission for supplying a sufficient amount of light to the subject for photography (for obtaining an appropriate amount of exposure). If the redeye reduction emission function is enabled, a redeye reduction emission is further performed prior to the preliminary emission.

The operation of the built-in flash 4 depends not only on the operation of the shutter release button 2, but also on the imaging mode selected by the mode dial 3 and flash emission mode set on the setting screen. Imaging modes include "AUTO" in which all of the settings for photography are set automatically by the camera, "MANUAL" in which all of the settings for photography are set manually by the user. Further, "Program Auto", "Shutter-Priority Auto", "Aperture-Priority Auto", "Shake Reduction", "Natural Photo", "Portrait", "Landscape", "Night Scene", and the like are provided as the imaging mode. As for the flash emission mode, "AUTO Flash", "Forced Flash", "Slow Synchronization", "Redeye Reduction", "Redeye Reduction+Slow Synchronization", and the like are provided.

The digital camera 1 set to "AUTO" mode as the imaging mode, and to "AUTO Flash" as the flash emission mode causes the built-in flash to pop up automatically and to emit a flash in association with the shutter release button 2, if it determines that flash photography is required. On the other hand, the "Natural Photo" is a mode in which non-flash emission photography is performed. Therefore, in the digital camera 1 set to this mode, the operation of the shutter release button 2 does not cause the built-in flash 4 to function. The digital camera 1 set to "Redeye Reduction" or to "Redeye Reduction+Slow Synchronization" for the flash emission mode performs a redeye reduction emission for preventing a redeye phenomenon by contracting the pupils of a subject. The digital camera 1 set to "Portrait" for the imaging mode also performs the redeye reduction emission automatically if a predetermined condition is satisfied. Also, in each of the other modes, the operation of the built-in flash 4 is predetermined so as to meet the purpose of the mode.

In the digital camera 1, an external flash 7 may be attached to the hot shoe 5 and used, as illustrate in FIG. 1C. The external flash 7 is mechanically and electrically connected to the digital camera 1 when attached to the hot shoe 5, and emits a flash according to the mode selected by the mode dial 3 in association with a second step depression of the shutter release button 2, as in the built-in flash 4. Hereinafter, description will be made focusing on the example embodiment illustrated in FIGS. 1A and 1B, but the present invention is applicable to any digital camera regardless of whether the flash is a built-in or external type.

Figure 2:
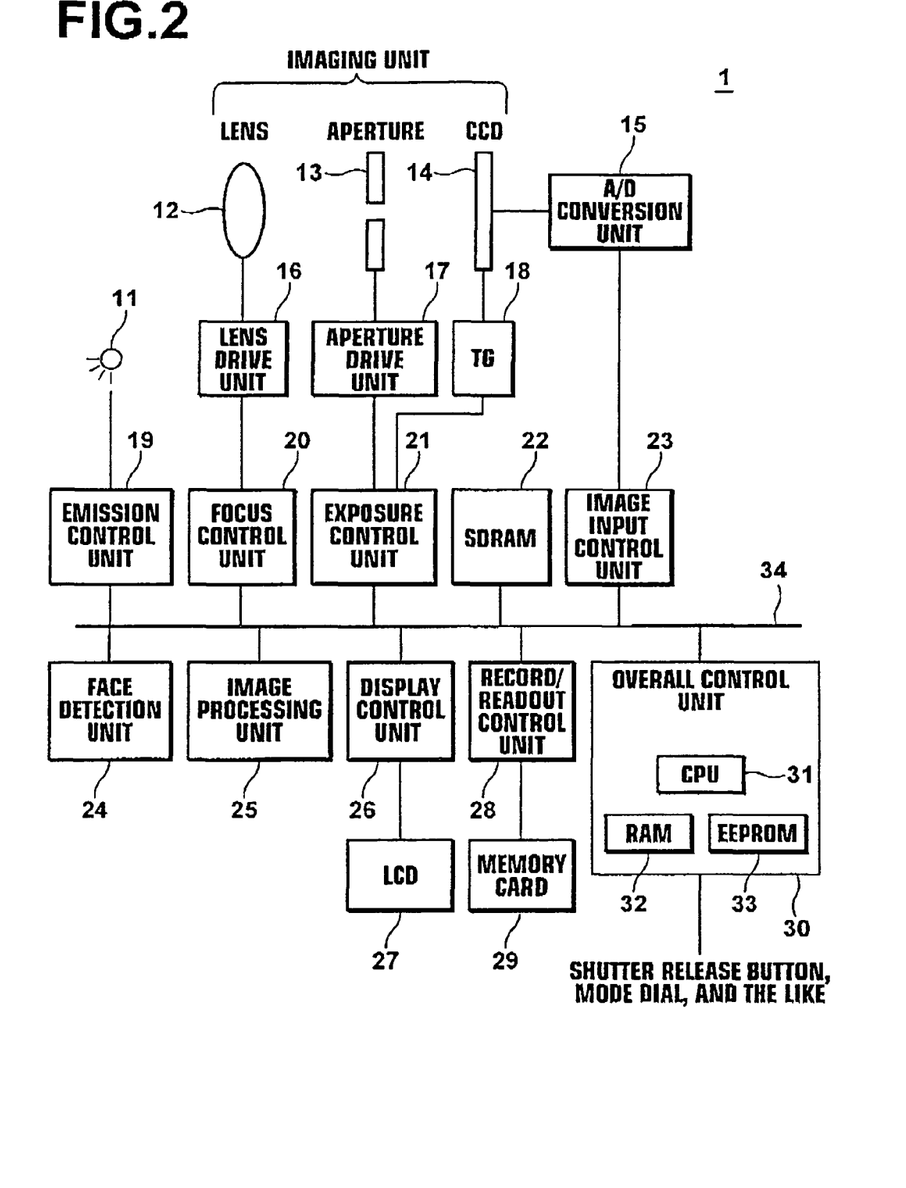
FIG. 2 illustrates an internal structure of the digital camera.

Next, the internal structure of the digital camera 1 will be described briefly with reference to FIG. 2. As illustrated in FIG. 2, the digital camera 1 has an imaging system which includes a lens 12, a lens drive unit 16, an aperture 13, an aperture drive unit 17, a CCD 14, and a timing generator (TG) 18. The lens 12 includes a plurality of functional lenses, including a focus lens for focusing the camera onto a subject, a zoom lens for realizing a zoom function, and the like. The lens drive unit 16 includes a small motor, such as a stepping motor, and controls the position of each of the functional lenses so that the distance of the lens from the CCD 14 meets the purpose of the lens. The aperture 13 includes a plurality of aperture blades. The aperture drive unit 17 includes a small motor, such as a stepping motor, and controls the positions of the aperture blades so that the opening size of the aperture meets the purpose of the aperture. The CCD 14 is a CCD with five million to twelve million pixels, having primary color filters, and outputs stored charges in response to an instruction signal from the timing generator 18. The timing generator 18 sends a signal to the CCD 14 to cause the CCD 14 to store charges therein only during a desired time period, thereby the shutter speed is controlled.

The digital camera 1 further includes: an A/D converter unit 15 for converting output signals of the CCD 14 to digital signals; an image input control unit 23 for transferring image data outputted from the A/D converter unit 15 to other processing units through a system bus 34; and a SDRAM 22 for tentatively storing image data transferred from the image input control unit 23. The image data stored in the SDRAM 22 are RAW format data.

The digital camera 1 further includes: a flash 11; an emission control unit 19 for controlling the timing and emission amount of the flash 11; a focus control unit 20 for focusing a lens by instructing the lens drive unit 16 to move the lens; an exposure control unit 21 for sending an instruction signal to the aperture drive unit 17 and timing generator 18; and a face detection unit 24 for performing face detection on the image data stored in the SDRAM 22. The emission control unit 19, focus control unit 20, and exposure control unit 21 may sometimes perform processing with reference to the face detection result performed by the face detection unit 24, as well as the image data stored in the SDRAM 22. As for the method for controlling exposure and focus with reference to the face detection result, a method as described, for example, in U.S. Patent Application Publication No. 20030071908 may be used. Whether or not the emission control unit 19, focus control unit 20, and exposure control unit 21 refer to the face detection result outputted from the face detection unit 24 depends on the selected imaging mode and other setting values.

The digital camera 1 further includes an image processing unit 25 for performing image processing on the image data stored in the SDRAM 22. The image processing unit 25 performs various finishing processes for making the image attractive, including color tone and brightness corrections, as well as correction of redeye if included, and stores back the processed image data in the SDRAM 22 again.

The digital camera 1 further includes a display control unit 26 for controlling output of the image data stored in the SDRAM 22 to a liquid crystal display (LCD) 27. The display control unit 26 performs pixel skipping on the image data stored in the SDRAM 22 in order to make the image data to an appropriate size for display before outputting to the liquid crystal display 27.

The digital camera 1 further includes a record/readout control unit 28 for controlling recording of the image data stored in the SDRAM 22 to a memory card 29, and loading of image data recorded in the memory card 29 to the SDRAM 22. The record/readout control unit 28 records the RAW data directly to the memory card 29, or after converting to JPEG data through an image compression coding technique depending on user setting. More specifically, the record/readout control unit 28 records an Exif (Exchangeable Image File Format) file including image data and auxiliary information of the image data in the memory card 29. When loading JPEG image data to the SDRAM 22, the image data read out from the file are decoded and loaded into the SDRAM 22.

The digital camera 1 further includes an overall control unit 30 which includes a CPU (Central Processing Unit) 31, a RAM (Random Access Memory) 32 having therein an operational/control program, and EEPROM (Electrically Erasable and Programmable Read Only Memory) 33 having therein various setting values. The overall control unit 30 detects the imaging mode selected through the mode dial and other user setting operations, and causes the setting contents to be stored in the EEPROM 33. Then, according to the setting values stored in the EEPROM 33, the overall control unit 30 sends signals instructing the processes to be performed and execution timings of the processes to the emission control unit 19, focus control unit 20, exposure control unit 21, image input control unit 23, face detection unit 24, image processing unit 25, display control unit 26, and record/readout control unit 28 through the system bus 34 when the setting operation or imaging operation is performed.

Control of Flash Emission Amount

Hereinafter, control of flash emission amount by the emission control unit 19 will be described further.

First Embodiment

Figure 3:
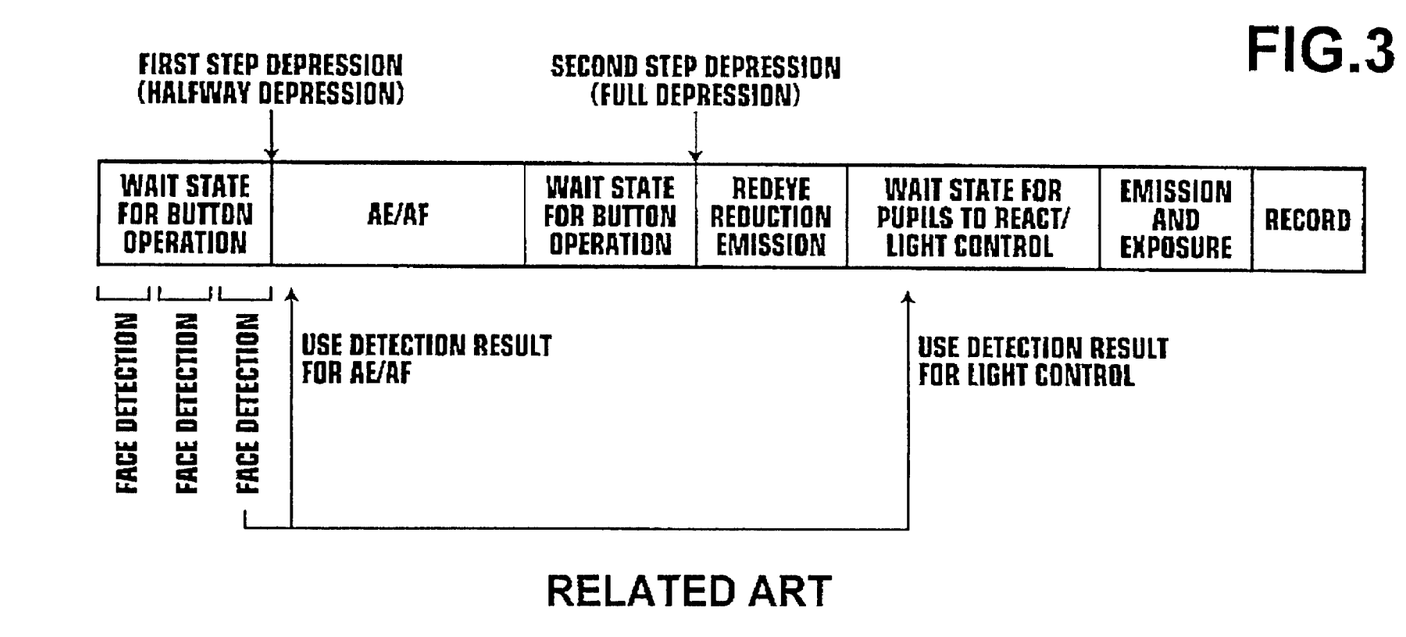
FIG. 3 illustrates the relationship, in an ordinary digital camera, between the operation of the shutter release button and the performance of the digital camera.
Figure 4:
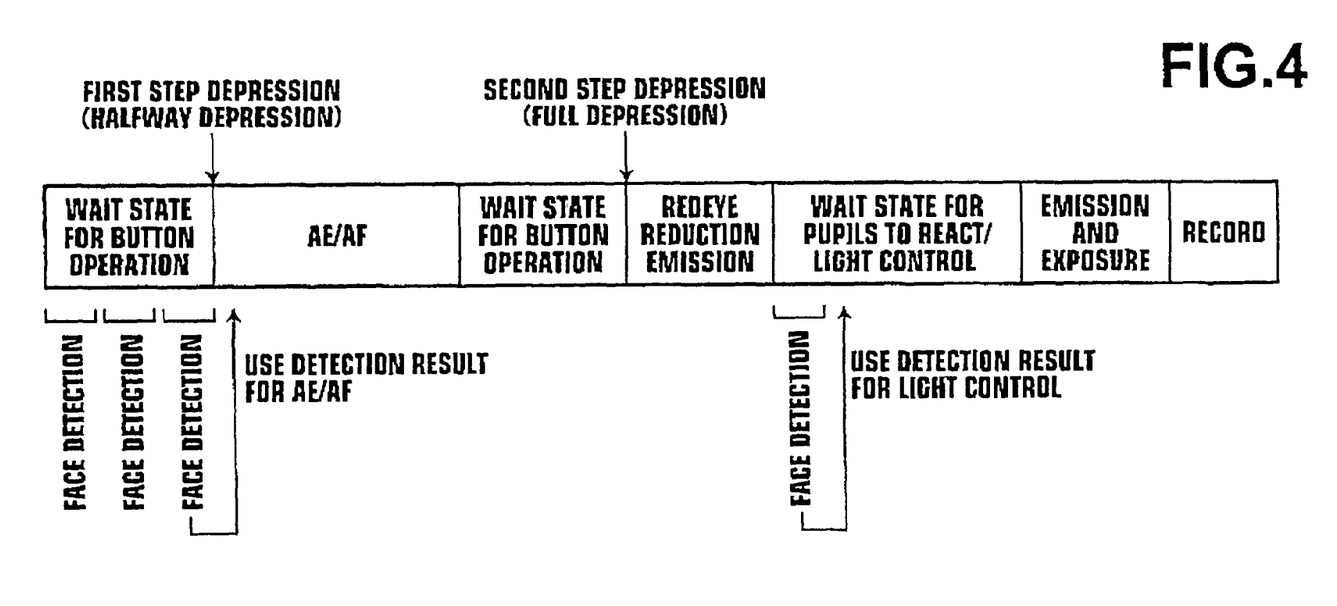
FIG. 4 illustrates the relationship, in a first embodiment, between the operation of the shutter release button and the performance of the digital camera.

FIGS. 3 and 4 are drawings in which flows of processes of digital cameras that perform auto exposure control, auto focus control, and auto emission control using face detection results are arranged temporally from left to right, illustrating the relationships between the operations of the shutter release button and performance of the digital cameras. FIG. 3 illustrates the relationship between the operation and performance of an ordinary digital camera, and FIG. 4 illustrates the relationship between the operation and performance of a digital camera 1 according to the present embodiment.

As illustrated in FIG. 3, when a first step depression of the shutter release button is performed while the digital camera is in a wait state for a button operation, the digital camera performs AE/AF, and returns to a wait state for a button operation again after completing the AE/AF. In this state, if a second step depression of the shutter release button is performed, the digital camera performs a redeye reduction emission. Thereafter, light control is performed during the wait time for the pupils of a subject to contract to a certain degree in response to the redeye reduction emission, in which an amount of flash emission is determined by measuring an amount of light required by the subject. Then, the digital camera causes the flash to emit light with the determined amount (main emission), and causes the electronic shutter to open for a predetermined time for exposure. Then, the digital camera causes the image data generated by the exposure to be recorded on a memory card mounted in the digital camera, and returns to a wait state for a button operation. Note that the aforementioned performance of the digital camera is performance when a first step depressing operation of the shutter release button is performed and then after a while a second step depressing operation is performed. If the shutter release button is depressed directly to the second step, the digital camera performs a redeye reduction emission immediately after the AE/AF.

As illustrated in FIG. 3, in an ordinary digital camera, face detection is performed repeatedly before the shutter release button is depressed, and the detection result is used for AE/AF, and further for light control. In contrast, the digital camera 1 according to the present embodiment performs face detection on the image data obtained when a redeye reduction emission is performed, and performs light control using the detection result, as illustrated in FIG. 4.

Figure 5:
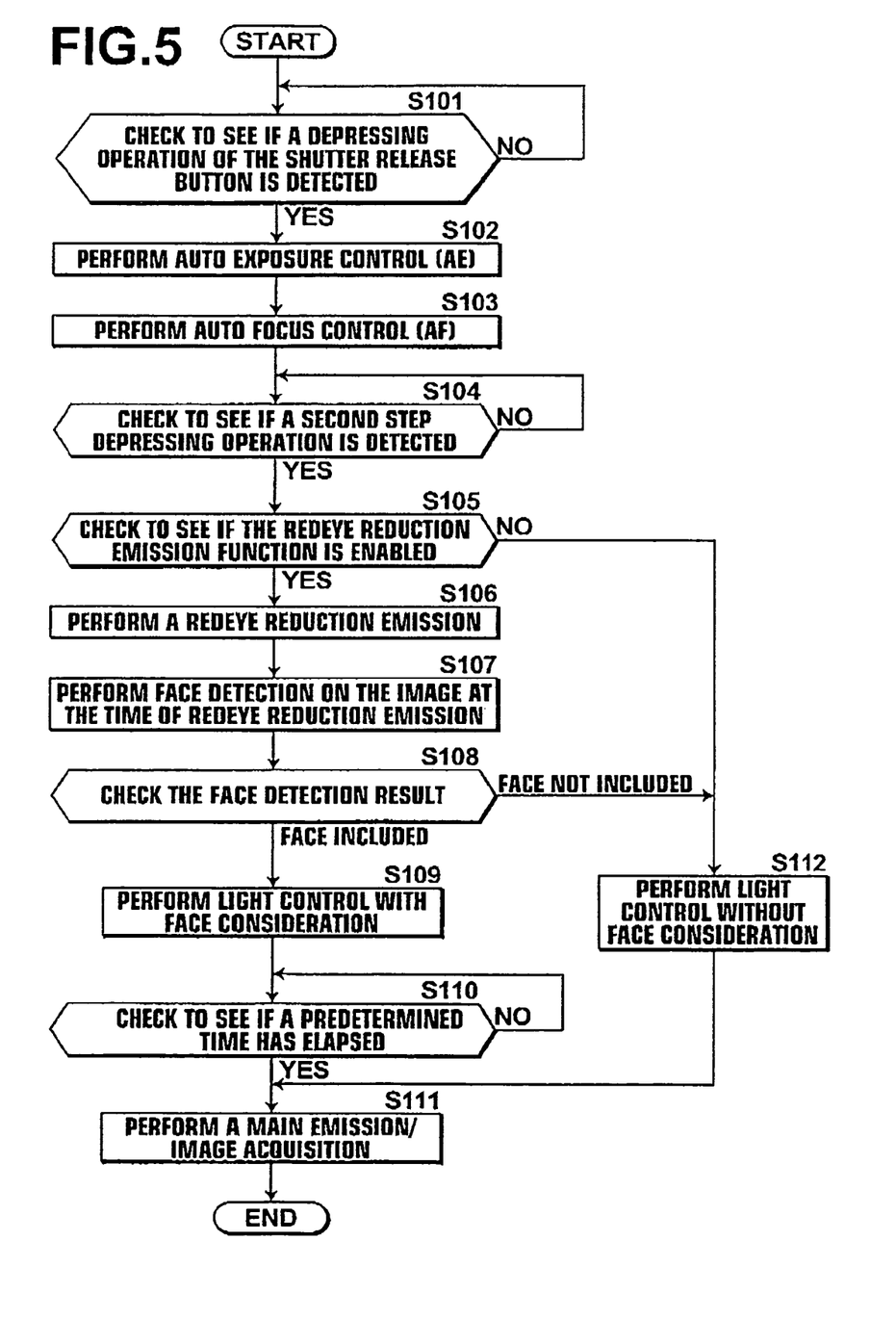
FIG. 5 is a flowchart illustrating a process of flash photography of the digital camera according to the first embodiment.

FIG. 5 is a flowchart illustrating a process of flash photography of the digital camera according to the present embodiment. Hereinafter, process steps shown in the flowchart will be described in relation to the structure of the digital camera 1 shown in FIG. 2.

When a depressing operation of the shutter release button 2 is detected (S101), the overall control unit 30 sends a notification signal to the focus control unit 20 and exposure control unit 21, notifying of the shutter depression. In response to the notification signal, exposure control unit 21 performs auto exposure control (S102), and the focus control unit 20 performs auto focus control (S103). If the depressing operation detected in step S101 is a first step depressing operation, the next step is not performed until a second depressing operation is detected. If the depressing operation detected in step S101 is a second step depressing operation, the next step (S104) is performed immediately after the completion of the auto focus control in step S103.

The overall control unit 30 refers to the value representing ON or OFF of the redeye reduction emission function of the values set in the EEPROM (S105), and if the value is "OFF", the overall control unit 30 sends a signal to the emission control unit 19 instructing to perform light control without face consideration. If the referred value is "ON", the overall control unit 30 sends a signal to the emission control unit 19 instructing to perform a redeye reduction emission. In response to the instruction signal, the emission control unit 19 causes the flash 11 to emit light with a predetermined amount (redeye reduction emission) (S106).

Further, the overall control unit 30 sends a signal to the face detection unit 24 instructing to perform face detection and to supply the detection result to the emission control unit 19. In response to the instruction signal, the face detection unit 24 reads out an image from SDRAM 22, obtained by the imaging unit and stored in the SDRAM 22 through the image input control unit 23, and performs face detection (S107). The detection result is supplied to the emission control section 19 as described above.

The emission control section 19 refers to the supplied detection result (S108), and if face information is included in the detection result, it performs light control with face consideration (S109). After the light control with face consideration is performed, the process waits for a predetermined time to elapse from the redeye reduction emission in step S106 (S110), and then notifies the overall control unit 30 of the completion of the light control. If face information is not included in the detection result referred to in step S108, the emission control unit 19 performs light control without face consideration (S112), and notifies the overall control unit 30 of the completion of the light control.

In response to the notification, the overall control unit 30 controls each unit so that flash emission (main emission) is performed in synchronization with imaging (S111). The emission control unit 19 causes the flash 11 to flash with an amount determined in step S109 or step S112 at a timing instructed by the overall control unit 30. At the same timing, the exposure control unit conveys the aperture value and shutter speed determined in step S102 to the aperture drive unit 17 and timing generator 18 to perform exposure. The image input control unit 23 transfers the image data supplied from the A/D converter unit 15 resulting from the exposure to the record/readout control unit 28. The record/readout control unit 28 records the image data on the memory card 29. This completes the flash photography.

In the example process described above, light control without face consideration is performed when the redeye reduction emission function is "OFF". But, an arrangement may be adopted in which face detection is also performed before step S105, and light control with face consideration is performed using the detection result obtained before step S105 when the redeye reduction emission function is "OFF".

Figure 6A:
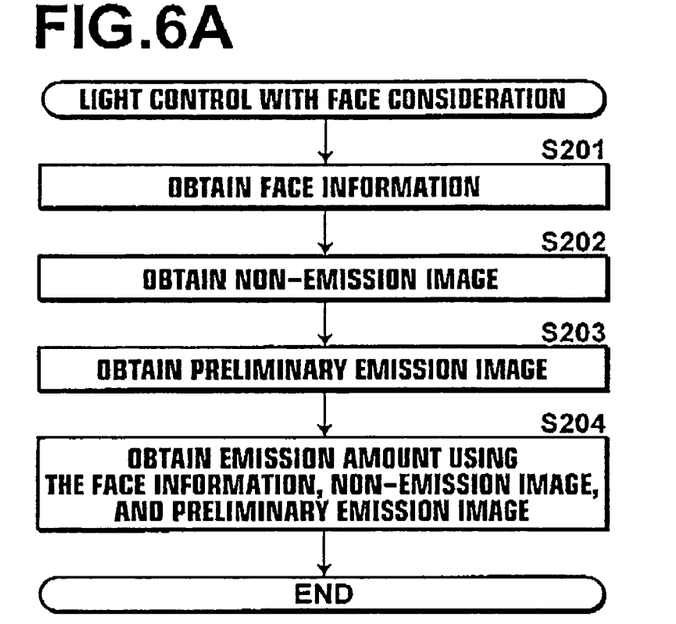
FIG. 6A illustrates an example light control process using face information.

FIG. 6A illustrates an example process of light control with face consideration performed in step S109. When performing light control with face consideration, the emission control unit 19 first obtains face information included in the detection result (S201), as illustrated in FIG. 6A. Then, as in the conventional light control method, it obtains an image obtained without flash emission, i.e., the latest image data stored in the SDRAM 22 (S202). Further, it causes the flash 11 to perform preliminary emission, and obtains image data recorded through the preliminary emission and stored in the SDRAM 22 (S203). Then, the flash control section 19 performs an arithmetic operation using the face information, non-emission image, and preliminary emission image to obtain the emission amount for main emission (S204). For example, each of the preliminary emission image and non-emission image is divided into a plurality of regions, then the reflected light amount from each of the regions is estimated by obtaining the difference in the data with respect to each region, and the emission amount is determined based only on the reflected light amount from a region corresponding at least to a portion of the face, or an appropriate emission amount is determined by performing a weighted arithmetic operation weighted such that the reflected light amount from the region corresponding at least to a portion of the face has stronger influence than that of the region other than the region corresponding at least to a portion of the face.

Figure 6B:
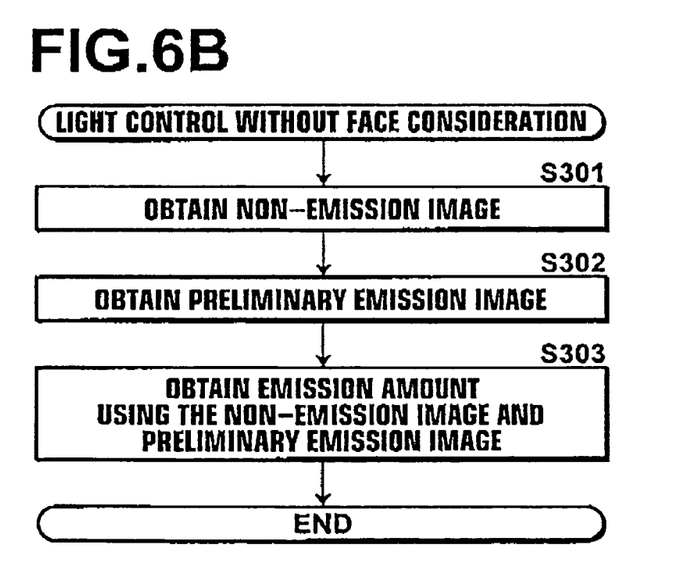
FIG. 6B illustrates an example light control process without using face information.

In the mean time, FIG. 6B is a flowchart illustrating an example process of light control without face consideration performed in step S112. When performing light control without face consideration, a non-emission image is obtained (S301), then a preliminary emission image is obtained (S302), and the emission amount for the main emission is obtained using the two images (S303), as illustrated in FIG. 6B. For example, a reflected light amount from each region of the subject is estimated by obtaining the difference between the non-emission image and preliminary emission image, and the emission amount for the main emission is obtained based on the average value of the reflected amounts from the entire subject.

Note that the light control processes performed in step S109 and step S112 are not limited to those described above. For example, the light control process may be a process that does not perform preliminary emission, and obtains an appropriate emission amount by estimating the reflected light amount from each region from the image of redeye reduction emission and non-emission image.

As described above, the digital camera according to the present embodiment performs face detection on the image data obtained at the time of redeye reduction emission, and performs light control during the wait time from the time when the redeye reduction emission is performed to the time when the pupils react to the redeye reduction emission. This may reduce the time interval from the time when image data for face detection are obtained to the time when image data for light control are obtained, so that the light control may be performed using the face detection result while it is effective. Further, the image data obtained when the redeye reduction emission is performed have sufficient brightness for performing face detection, so that face detection may be performed more accurately in comparison with the face detection performed on image data obtained by non-emission imaging. This allows the emission amount obtained by the light control calculation to invariably become an appropriate value suitable for the situation of the subject.

Second Embodiment

The digital camera according to a second embodiment of the present invention is a digital camera that performs face detection after a redeye reduction emission is performed, as in the digital camera according to the first embodiment, but differs in that it performs the face detection on image data obtained after the redeye reduction emission. The overview and internal structure of the digital camera according to the present embodiment are identical to those of the digital camera according to the first embodiment. Therefore, they will not be elaborated upon further here.

Figure 7:
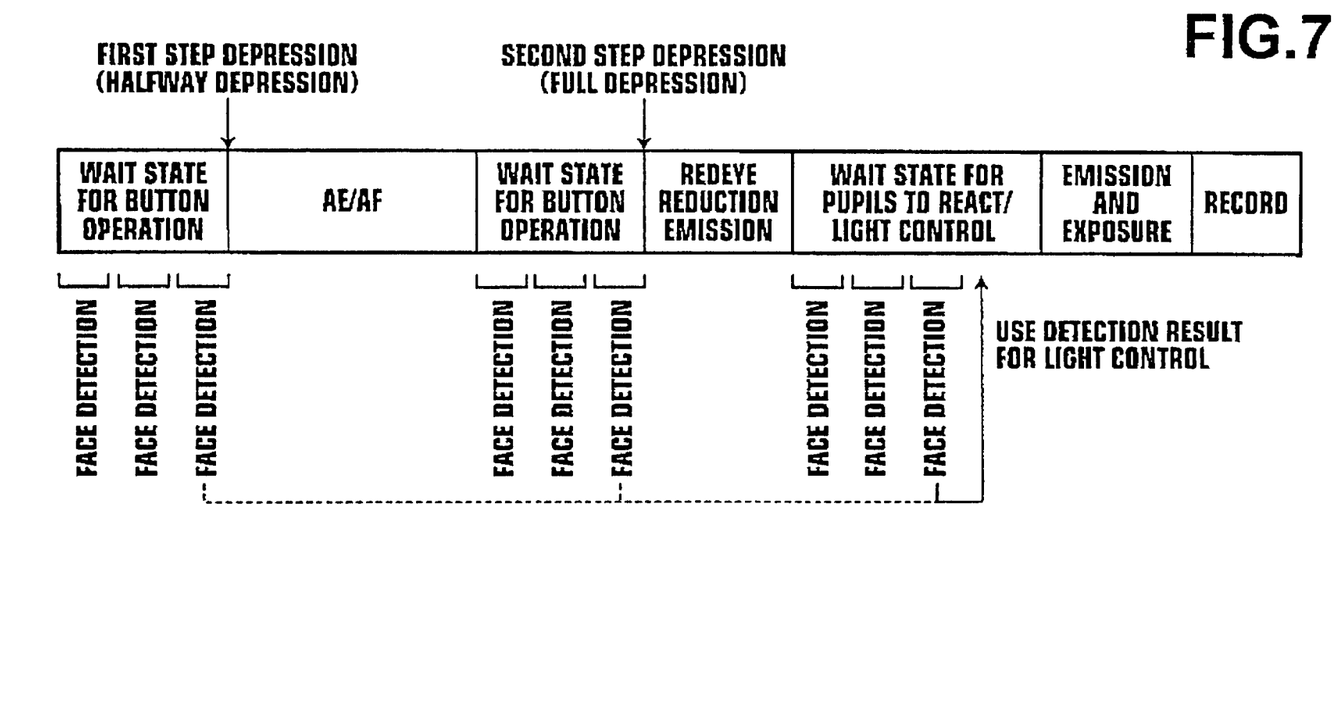
FIG. 7 illustrates the relationship, in a second embodiment, between the operation of the shutter release button and the performance of the digital camera.

FIG. 7 illustrates the relationship between the operation of the shutter release button and the performance of the digital camera according to the present embodiment. As illustrated in FIG. 7, the digital camera according to the present embodiment continuously obtains image data even in non-emission state after a redeye reduction emission is completed, and repeatedly performs face detection. Then, it performs light control using the latest result of the face detection results obtained during a time before the main emission is performed.

Further, the digital camera according to the present embodiment performs light control with face consideration using a result of face detection performed on image data obtained before the timing of redeye reduction emission when the redeye reduction function is "OFF". The detection result may be the result obtained for AE/AF before the shutter release button is depressed, or the result obtained during the time frame after AE/AF and before the second step depressing operation.

Figure 8:
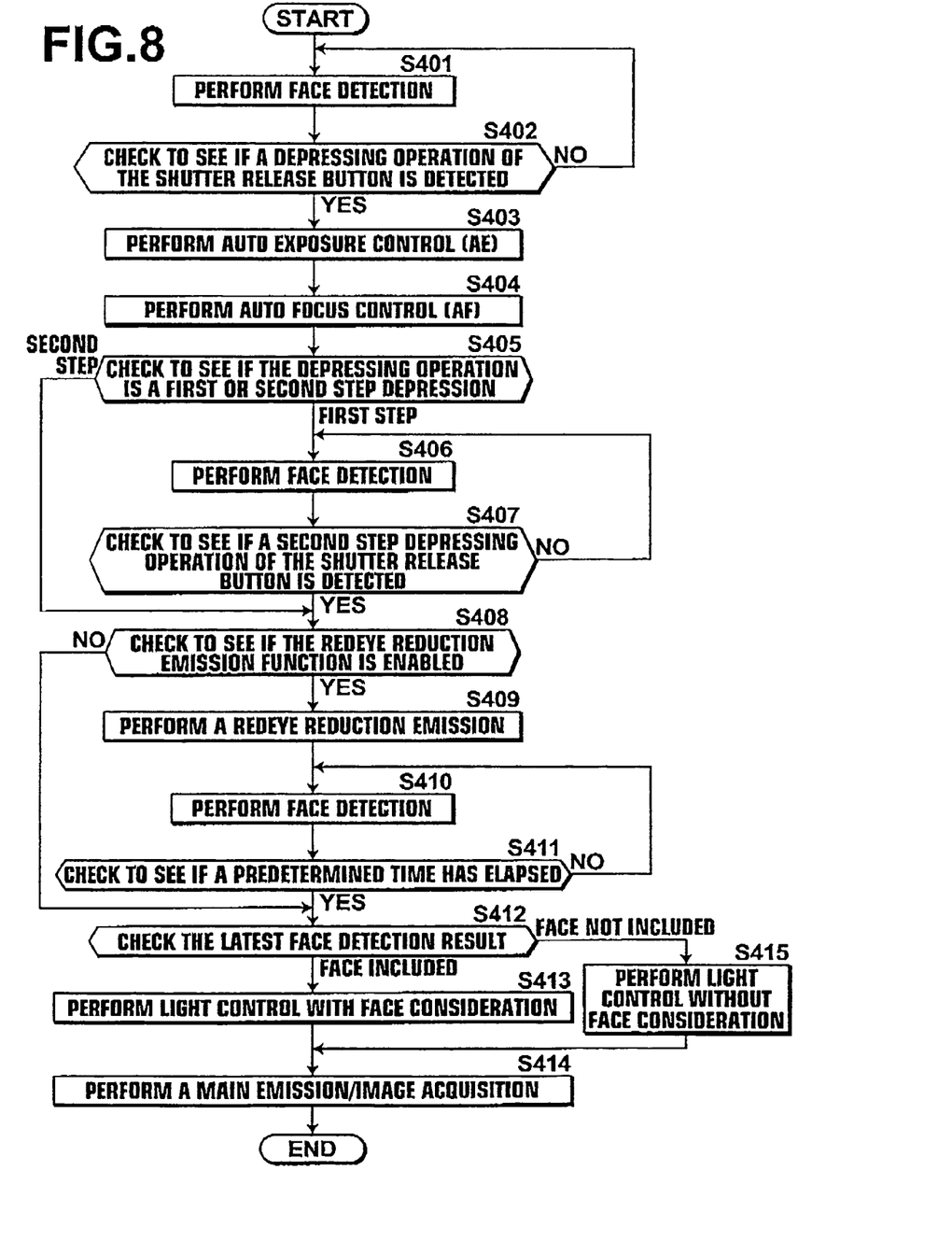
FIG. 8 is a flowchart illustrating a process of flash photography of the digital camera according to the second embodiment.

FIG. 8 is a flowchart illustrating a process of flash photography of the digital camera according to the present embodiment. Hereinafter, process steps shown in the flowchart will be described in relation to the structure of the digital camera shown in FIG. 2.

Of the setting values in the EEPROM, if the value indicating whether or not face detection is required is "positive" (required), the overall control unit 30 sends a signal to the face detection unit instructing to perform face detection and to supply the detection result to the emission control unit 19, focus control unit 20, and exposure control unit 21. In response to the signal, the face detection unit 24 initiates face detection (S401). The face detection is performed repeatedly until a depressing operation of the shutter release button 2 is detected. When the depressing operation of the shutter release button 2 is detected, the overall control unit 30 sends a notification signal to the emission control unit 19, focus control unit 20, and exposure control unit 21 notifying of the detection. In response to the notification signal, the exposure control unit 21 performs AE (S403), the focus control unit 20 performs AF (S404).

The emission control unit 19 determines whether the notified depressing operation is a first step depressing operation or a second step depressing operation (S405). If it is a first step depressing operation, the emission control unit 19 waits for a next notification signal from the overall control unit 30 (S407), while continuously receiving the detection results from the face detection unit 24 (S406). When a second step depressing operation is detected, the overall control unit 30 refers to the value indicating ON or OFF of the redeye reduction emission function of the setting values in the EEPROM (S408). If the value is "ON", the overall control unit 30 sends a signal to the emission control unit 19 instructing to perform a redeye reduction emission. In response to the instruction signal, the emission control unit 19 sets the emission amount to a value pre-stored for redeye reduction emission and causes the flash 11 to flash. This causes a redeye reduction emission to be performed (S409).

After the redeye reduction emission is performed, the emission control unit 19 continuously receives the detection results from the face detection unit 24 (S410), and waits for a predetermined time to elapse (S411). After the predetermined time has elapsed, the emission control unit 19 refers to the latest result of the face detection results received so far from the face detection unit 24 (S412). The detection result referred to here is, in general, the latest result of the detection results obtained in step S410.

In the mean time, if the value referred to in step S408 is the value indicating that the redeye reduction emission function is "OFF", the emission control unit 19 refers to the latest result of the detection results received so far from the face detection unit 24 (S412). The detection result referred to here is the latest result of the detection results obtained in step S406, if the shutter release button 2 is depressed in two steps. If the time from the detection of the first step depressing operation to the detection of the second step depressing operation is extremely short and face detection is not completed during that time period, however, the detection result referred to here is the latest result of the detection results obtained in step S401. Further, if the shutter release button is depressed directly to the second step, the detection result referred to here is the latest result of the detection results obtained in step S401.

If face information is included in the detection result referred to in step S412, the emission control unit 19 performs light control with face consideration (S413). If the detection result does not include face information, the emission control unit 19 performs light control without face consideration (S415). After the light control is completed, the emission control unit 19 notifies the overall control unit 30 of the completion.

In response to the notification, the overall control unit 30 controls each unit so that flash emission (main emission) is performed in synchronization with imaging (S414). The emission control unit 19 causes the flash 11 to flash with an amount determined in step S413 or step S415 at a timing instructed by the overall control unit 30. At the same timing, the exposure control unit conveys the aperture value and shutter speed determined in step S403 to the aperture drive unit 17 and timing generator 18 to perform exposure. The image input control unit 23 transfers the image data supplied from the A/D converter unit 15 resulting from the exposure to the record/readout control unit 28. The record/readout control unit 28 records the image data on the memory card 29. This completes the flash photography. For processes performed in steps S413 and S415, example processes described in the first embodiment may be applied.

As described above, the digital camera according to the present embodiment generates image data representing a subject and performs light control using detection result of the face detection performed on the generated image data during the wait time from the time when the redeye reduction emission is performed to the time when the pupils react to the redeye reduction emission. This results in the time period from the time when image data for face detection are obtained to the time when image data for light control are obtained becomes shorter than that of the first embodiment, so that the light control may be performed using the face detection result while it is effective. Further, even when the redeye reduction emission function is "OFF", light control with face consideration is performed, which allows flash photography to be performed invariably with an appropriate emission amount.

In the example process illustrated in FIG. 8, if the latest face detection result does not include face information, light control without face consideration is performed. But, an arrangement may be adopted in which the detection result of the face detection performed immediately after step S409, i.e., the face detection performed on the image obtained at the time of the redeye reduction emission is stored without overwritten, and when the latest face detection result does not include face information, the stored detection result is referenced. This allows light control with face consideration to be performed if the detection result of the face detection performed on the image obtained at the time of the redeye reduction emission includes face information even if the latest face detection result does not include face information.

The image obtained at the time of the redeye reduction emission allows a face to be detected easily, since the image is obtained with light being irradiated on the subject and the face portion is imaged brightly. Some of the images obtained without flash emission after the redeye reduction emission, however, are dark in the face portion and difficult to detect the face therefrom. Consequently, there may be a case in which a face is actually present, and the face is detected from the image obtained at the time of the redeye reduction emission, while the face is not detected from an image obtained without flash emission after the redeye reduction emission. As described above, if the detection result of the face detection performed on the image obtained at the time of the redeye reduction emission is stored for reference as required, even if a face is not detected successfully due to excessive darkness by the face detection performed on an image obtained without flash emission, light control with face consideration may be performed if the face is actually present. That is, it may prevent light control without face consideration from being performed when a face is actually present, and obtained face information may be utilized fully for the determination of flash emission amount.

Third Embodiment

The digital camera according to a third embodiment of the present invention is a digital camera that has both of the functions of the digital cameras according to the first and second embodiments, and either one of the functions is used selectively. The overview and internal structure of the digital camera according to the present embodiment are identical to those of the digital cameras according to the first and second embodiments. Therefore, they will not be elaborated upon further here.

Figure 9:
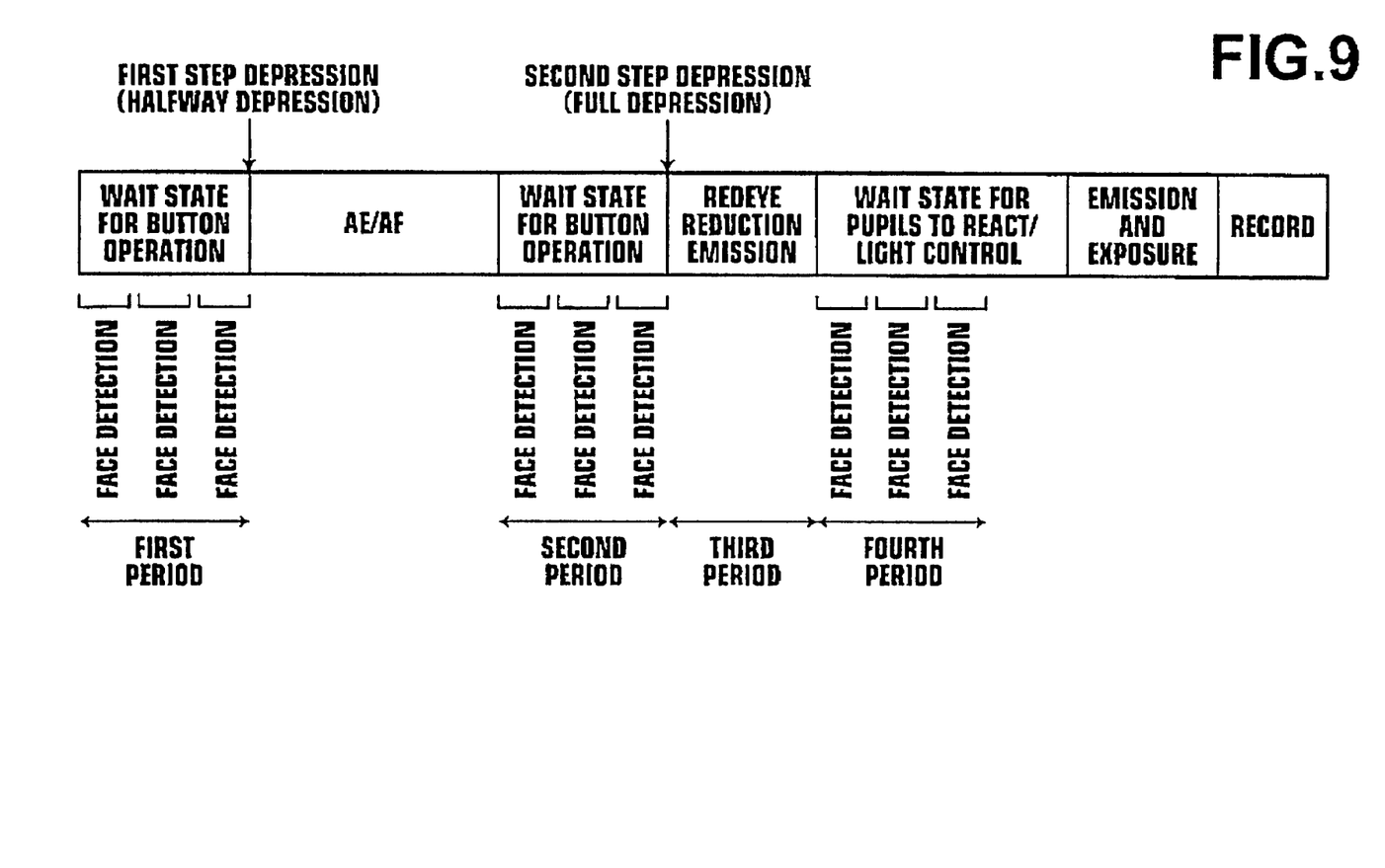
FIG. 9 illustrates the relationship, in a third embodiment, between the operation of the shutter release button and the performance of the digital camera.

As illustrated in FIG. 9, the digital camera according to the present embodiment repeats acquisition of image data and face detection on the obtained image data in each of the following four periods: a first period lasting until a depressing operation of the shutter release button is performed; a second period from the time when a first step depressing operation is performed to the time when a second step depressing operation is performed; a third period during which a redeye reduction emission is performed; and a fourth period of non-emission state after the redeye reduction emission is completed. If the shutter release button is depressed directly to the second step (full depression), the second period does not exit, and the acquisition of image data and face detection on the obtained image data are repeated in each of the three periods of the first, third, and fourth periods.

The latest detection result of each period or all of the detection results are supplied to the emission control unit 19. The emission control unit 19 performs light control by selectively using all or some of the supplied detection results.

In an example case, the emission control unit 19 initially refers to the face detection results in the third and fourth periods, and if a detection result including face information is obtained in either one of the periods, it performs light control with face consideration, i.e., the process illustrated in FIG. 6A using the face information. If detection results including face information are obtained in both of the periods, it uses the face information obtained in the fourth period. On the other hand, if neither of the detection results obtained in the third and fourth periods includes face information, it performs light control without face consideration, i.e., the process illustrated in FIG. 6B. Alternatively, the emission control unit 19 refers to the face detection result obtained in the first or second period, and if a detection result including face information is obtained in either the first or second period, it performs light control with face consideration using the face information. If neither of the detection results obtained in the first and second periods includes face information, it performs light control without face consideration.

According to the process described above, highly accurate light control with face consideration may be performed using the latest face information obtained by the face detection performed immediately preceding the light control, as in the second embodiment. Further, even if a face is not detected successfully due to insufficient brightness by the immediately preceding face detection, the light control with face consideration may be performed using the detection result at the time of the redeye reduction emission, as in the first embodiment. Further, even when face information is not obtained during the period after the redeye reduction emission, light control identical to that of the conventional digital cameras may be performed using face information obtained prior to the redeye reduction emission.

In an alternative embodiment, the emission control unit 19 initially refers to face detection results in the first period. If the face detection results in the first period do not include face information, it means that a person's face is not present in the imaging field when the shutter release button is operated by the user. In this case, it is reasonable to think that the user is trying to image a subject other than a face. If a face should be detected by the face detection processes performed in the second to fourth periods, it is highly likely that the face is not the imaging target intended by the user. Accordingly, if the face detection results in the first period do not include face information, light control without face consideration, i.e., the process illustrated in FIG. 6B is performed.

On the other hand, if face information is included in a face detection result when the shutter release button is operated, it is reasonable to think that the user is trying to image a person's face. Accordingly, when face information is included in the detection results of face detection in the first period, the detection results of face detection in the third and fourth are referenced. Then, if a detection result including face information is obtained in the third or fourth period, light control is performed using the face information. If a detection result including face information is not obtained in the third and fourth period, light control is performed using face information obtained in the first period. Alternatively, the light control may be performed using face information obtained in the second period. In this example, a determination is made in advance as to whether or not the imaging target is a person's face, so that emission amount control in line with the intention of the user may be performed.

In the third embodiment, a plurality of detection results is supplied from the face detection unit to the emission control unit in each of a plurality of periods (time points) of different states. Then, the emission control unit selectively refers to the plurality of detection results and selects an arithmetic operation from a plurality of arithmetic operations based on the referenced detection result. Here, the method for defining a plurality of periods (time points) is not limited to that described above in which four periods from first to fourth periods are defined. Other methods are also conceivable. Further, the selection criterion for referencing the detection result, types of arithmetic operations, and criterion for selecting an arithmetic operation are not limited to the examples described above.

So far, three exemplary embodiments have been described, but the present invention is not limited to these embodiments, and any method in which face detection is performed using image data obtained after a redeye reduction emission, and the flash emission amount is controlled using the result of the face detection belongs to the scope of the present invention.

What is claimed is:

1. A digital camera, comprising:
   an imaging unit for generating image data representing a subject;
   a storage unit for temporarily storing the image data generated by the imaging unit;
   an emission unit for emitting a flash;
   a face detection unit for detecting face information in the image data generated by the imaging unit; and
   an emission amount control unit for controlling an emission amount of the flash with reference to a detection result outputted from the face detection unit, wherein:
   the face detection unit supplies the detection result to the emission control unit at each of a plurality of predetermined time points, where a state of the digital camera differs, in a period from a time when generation of the image data is started by the imaging unit to a time when the flash is emitted by the emission unit; and
   when a plurality of detection results is supplied from the face detection unit, the emission amount control unit obtains the emission amount for the flash by selectively referring to the plurality of detection results and performing one of a plurality of types of arithmetic operations for obtaining the emission amount for the flash selected based on a referenced detection result, further comprising
   a two-step shutter release button and an operation detection unit for detecting a depressing operation of the shutter release button, wherein:
   the face detection unit supplies the detection result to the emission amount control unit at least at each of the following:
   (a) a time point immediately preceding a time when a first step depressing operation of the shutter release button is detected by the operation detection unit, and
   (b) a time point after the first step depressing operation of the shutter release button is detected by the operation detection unit and immediately preceding a time when a second step depressing operation of the shutter release button is detected by the operation detection unit; and
   the emission amount control unit determines whether or not face information is included in the detection result supplied at the time point (a) or (b) and selects a different arithmetic operation according to whether or not face information is included in the detection result.

2. The digital camera of claim 1, wherein, when the detection result supplied at the time point (a) does not include face information, the emission control unit selects an arithmetic operation that does not use face information.

3. A control method for use with a digital camera, having an imaging unit for generating image data representing a subject, an emission unit for emitting a flash, a face detection unit for detecting face information in the image data generated by the imaging unit, and an emission amount control unit for controlling the emission amount of the flash with reference to a detection result outputted from the face detection unit, to control an emission amount of the flash emitted by the emission unit, the method comprising the steps of:

setting a plurality of time points, where a state of the digital camera differs, in a period from a time when generation of the image data is started by the imaging unit to a time when the flash is emitted by the emission unit, each time point being a time point at which the detection result of the face detection unit is supplied to the emission control unit; and obtaining the emission amount for the flash by selectively referring to a plurality of detection results and performing one of a plurality of types of arithmetic operations for obtaining the emission amount for the flash selected based on a referenced detection result, wherein, when the digital camera further includes a two-step shutter release button and an operation detection unit for detecting a depressing operation of the shutter release button, the method comprising the steps of:

setting at least the following as the plurality of time points:

(a) a time point immediately preceding a time when a first step depressing operation of the shutter release button is detected by the operation detection unit, and (b) a time point after the first step depressing operation of the shutter release button is detected by the operation detection unit and immediately preceding a time when a second step depressing operation of the shutter release button is detected by the operation detection unit;

determining whether or not face information is included in the detection result supplied at the time point (a) or (b); and selecting a different arithmetic operation according to whether or not face information is included in the supplied detection result.

4. The control method of claim 3, wherein, when the detection result supplied at the time point (a) does not include face information, selecting an arithmetic operation that does not use face information.

* * * * *